Patented June 18, 1929.

1,717,585

UNITED STATES PATENT OFFICE.

WALTER SCHOELLER, OF BERLIN-WESTEND, AND HERBERT SCHOTTE, OF BERLIN-WILMERSDORF, GERMANY, ASSIGNORS TO THE FIRM: CHEMISCHE FABRIK AUF ACTIEN, VORM. E. SCHERING, OF BERLIN, GERMANY.

ALKALOID SALTS AND PROCESS OF MAKING SAME.

No Drawing. Application filed June 20, 1927, Serial No. 200,299, and in Germany June 26, 1926.

Our invention refers to pharmaceutical products and more especially to salts of the solaneæ alkaloids and to the method of making same.

In our copending application Serial No. 175,923, filed March 16, 1927, we have stated that solaneæ alkaloids will combine with solutions of camphoric acid in organic solvents, or with camphoric acid salts only in molecular proportion of 1:1, the products of this combination being well crystallized salts.

We have now ascertained that it is also possible to produce neutral salts of camphoric acid and solaneæ alkaloids, provided that the solutions of the components are evaporated to dryness under certain precautionary measures. For we have found that these neutral salts of one or two solaneæ alkaloids are extremely sensitive against solvents, more especially water, alcohol, ether, etc., inasmuch as when dissolved they tend to dissociate, an equilibrium being formed between the components. The same property is, by the way, to be found in a great number of acids of higher basicity, such as malonic acid, phthalic acid, meconic acid, tartaric acid, saccharic acid, etc., and also inorganic acids such as sulfuric acid, sulfur-dioxide, phosphoric acid, and so on.

The invention can be carried out either by simply combining the components in the presence of a solvent and thereafter removing the solvent in a cautious manner or by treating an acid salt of a solaneæ alkaloid with a further molecule of the same or some other alkaloid in the presence of a solvent which is then also removed in a cautious manner. We can, however, also proceed in such manner that the solaneæ alkaloids and the acid are caused to react with each other in the form of their salts in a suitable solvent in such manner that the anion of the solaneæ alkaloid salt and the kation of the acid are caused to settle down in the form of a salt-like precipitate which is not readily soluble in the solvent, whereupon the precipitate is separated and the solvent is removed in a cautious manner.

The neutral mixed salts obtained according to this invention are constituted according to the formula

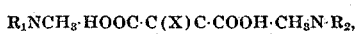

wherein $R_1$ is scopolamin, $R_2$ hyoscyamin or atropin, and X a radical of a polybasic acid. They possess very valuable therapeutical properties and the same applies to their combinations with other compounds.

Example 1.

1.5 grams scopolamin are dissolved in 5 ccms. n-sulfuric acid and are combined with a solution of 1.5 grams hyoscyamin in 5 ccms. n-sulfuric acid. To this mixture is now added a solution of 1 gram camphoric acid in the calculated quantity of baryta, the barium sulfate is separated by filtration and the filtrate which is now free from sulfuric acid and baryta is evaporated to dryness in vacuo. The product obtained is scopolamin-hyoscyamin comphorate,

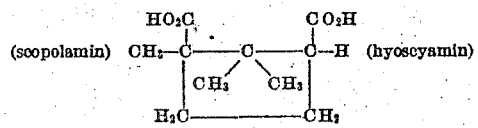

a syrup which in concentrated solution shows a neutral reaction with lakmus. From its watery solution atropin can be recovered by extraction with ether. The phthalate can be obtained in an analogous manner. It is very much alike to the camphorate and forms an oil which undergoes hydrolysis in watery solution.

Example 2.

Molecular quantities of atropin base and scopolamin base in alcoholic solution are combined with an alcoholic solution of tartaric acid, and the alcohol is driven off at ordinary temperature. The product obtained is the neutral atropin-scopolamin tartrate having the formula.

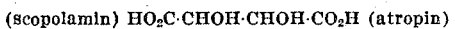

and forming a syrup which readily dissolves in media containing hydroxyl ions and is readily converted into the acid salts by hydrolysis. The corresponding salt of succinic acid can be obtained in an analogous manner.

*Example 3.*

Molecular quantities of scopolamin meconate melting at 175° C. are stirred in concentrated watery solution with hyoscyamin base until the whole is dissolved. The solution is now evaporated under reduced pressure and a syrup is obtained which is hyoscyamin scopolamin meconate having the formula

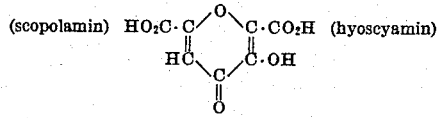

and forming a syrup showing neutral reactions with lakmus and dissolving readily in alcohol and water. The corresponding salt of terephthalic acid can be obtained in an analogous manner. It has the form of a syrup which is less readily soluble than the meconate.

*Example 4.*

An etheric solution of hyoscyamin, scopolamin, and malonic acid is evaporated to dryness at a pressure of 15 mms mercury, the resulting product being hyoscyamin scopolamin malonate having the formula.

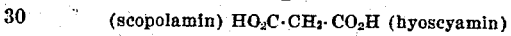

and forming an oil which readily dissolves in water and in methyl and ethyl alcohol, but is insoluble in petrol ether.

*Example 5.*

A molecular mixture of scopolamin and atropin is neutralized in watery alcoholic solution with sulfuric acid and brought to dryness in vacuo. There is obtained the sulfate having the formula

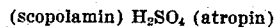

and forming a solid amorphous hydroscopic mass which dissolves with the greatest ease in media containing hydroxyl ions. The sulfite can be produced in an analogous manner.

Various changes may be made in the details disclosed in the foregoing specification without departing from the invention or sacrificing the advantages thereof.

We claim:—

1. The method of producing mixed solaneæ alkaloid salts of polybasic acids, comprising preparing a solution of equimolecular quantities of two different solaneæ alkaloids and of a polybasic acid in a volatile solvent and allowing the solvent to evaporate at low temperature.

2. The method of producing mixed solaneæ alkaloid salts of polybasic acids, comprising adding to an acid salt of a solaneæ alkaloid and a polybasic acid the equimolecular quantity of another solaneæ alkaloid in the presence of a volatile solvent and allowing the solvent to evaporate at low temperature.

3. The method of producing mixed solaneæ alkaloid salts of polybasic acids, comprising combining equimolecular quantities of two different salts of solaneæ alkaloids with the equimolecular quantity of a salt of a polybasic acid in a volatile solvent in such manner that the anion of the alkaloid salts and the kation contained in the salt of the polybasic acid form a compound which is not readily soluble in the solvent, separating the deposit from the solvent and evaporating this latter at low temperature.

4. The method of producing scopolamin hyoscyamin camphorate comprising dissolving separately equal parts scopolamin and hyoscyamin in sulfuric acid, mixing the solution, adding a solution of camphoric acid in baryta, filtering of the barium sulfate and evaporating the filtrate to dryness in vacuo.

5. As a new composition of matter, a mixed solaneæ alkaloid salt of a polybasic acid having the general formula

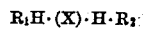

wherein $R_1$ and $R_2$ are two solaneæ alkaloids and X a radical of a polybasic acid.

6. As a new composition of matter, a mixed solaneæ alkaloid salt of a polybasic acid having the general formula

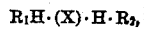

wherein $R_1$ and $R_2$ are two different solaneæ alkaloids and X a radical of a di-basic organic acid.

7. As a new product, the mixed solaneæ alkaloid salt having the formula

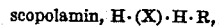

wherein R is a solaneæ alkaloid other than scopolamin and X a radical of a di-basic organic acid.

8. As a new product the mixed solaneæ alkaloid salt having the formula

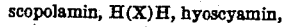

wherein X is a radical of a di-basic organic acid.

9. As a new product, scopolamin hyoscyamin camphorate having the formula

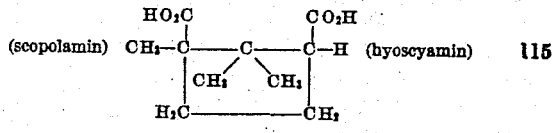

being a syrup which in neutral solution shows a neutral reaction with litmus.

In testimony whereof we affix our signatures.

WALTER SCHOELLER.
HERBERT SCHOTTE.